United States Patent
Ji et al.

(10) Patent No.: US 11,438,564 B2
(45) Date of Patent: Sep. 6, 2022

(54) APPARATUS AND METHOD FOR NEAR-EYE DISPLAY BASED ON HUMAN VISUAL CHARACTERISTICS

(71) Applicant: LUMICORE MICROELECTRONICS SHANGHAI CO. LTD., Shanghai (CN)

(72) Inventors: Yuan Ji, Shanghai (CN); Tingzhou Mu, Shanghai (CN); Wendong Chen, Shanghai (CN); Qin Gao, Shanghai (CN); Yunsen Yu, Shanghai (CN)

(73) Assignee: LUMICORE MICROELECTRONICS SHANGHAI CO. LTD., Shanghai (CN)

( * ) Notice: Subject to any disclaimer, the term of this patent is extended or adjusted under 35 U.S.C. 154(b) by 72 days.

(21) Appl. No.: 17/060,840

(22) Filed: Oct. 1, 2020

(65) Prior Publication Data
US 2021/0092343 A1 Mar. 25, 2021

Related U.S. Application Data

(63) Continuation of application No. PCT/CN2020/076512, filed on Feb. 25, 2020.

(30) Foreign Application Priority Data

Feb. 25, 2019 (CN) .......................... 201910137890.3
Feb. 25, 2019 (CN) .......................... 201910138436.X

(51) Int. Cl.
*H04N 13/111* (2018.01)
*H04N 13/383* (2018.01)
(Continued)

(52) U.S. Cl.
CPC ....... *H04N 13/111* (2018.05); *G02B 27/0172* (2013.01); *H04N 13/339* (2018.05); *H04N 13/383* (2018.05); *G02B 2027/014* (2013.01)

(58) Field of Classification Search
CPC ...... G02B 2027/014; G02B 2027/0147; G02B 27/0093; G02B 27/0172; G06T 3/0012;
(Continued)

(56) References Cited

U.S. PATENT DOCUMENTS 10,001,537 B2 * 6/2018 Takeshima ....... G01R 33/56509
10,010,249 B1 * 7/2018 Sadda .................. A61B 3/0041
(Continued)

FOREIGN PATENT DOCUMENTS

CN 105049835 A 11/2015
CN 105812767 A 7/2016
(Continued)

OTHER PUBLICATIONS

Xin Zhang, Research on Expression Rendering Algorithm Based on Human Vision Physiology and Psychology, Published Nov. 30, 2011, Zhejiang University.
(Continued)

*Primary Examiner* — Dmitriy Bolotin
(74) *Attorney, Agent, or Firm* — Dragon Sun Law Firm, PC; Jinggao Li, Esq.; Nathaniel Perkins

(57) ABSTRACT

The present disclosure discloses near-eye display method and apparatus based on human visual characteristics, and the method includes: dividing a near-eye display screen into n display subregions; acquiring critical spatial frequencies corresponding to the n display subregions respectively; creating and rendering corresponding video image data of n layers for the n display subregions from an input video image according to the critical spatial frequencies corresponding to the n display subregions respectively; transmitting the video image data of the n layers to the near-eye display; and finally, performing reconstruction on and stitching the video image data of the n layers to generate an image which accords with a human gaze effect, and displaying the
(Continued)

image in the display screen. The control method of the near-eye display according to the present disclosure may greatly decrease an amount of data transmitted from an image generating source to the near-eye display, reduce a transmission bandwidth, support higher display resolution and refresh rate, reduce power consumption, accord with spatial distribution characteristics of human eyes and meanwhile alleviate a dizzy phenomenon.

20 Claims, 8 Drawing Sheets

(51) Int. Cl.
*H04N 13/339* (2018.01)
*G02B 27/01* (2006.01)

(58) Field of Classification Search
CPC ... H04N 13/111; H04N 13/339; H04N 13/383
See application file for complete search history.

(56) References Cited

U.S. PATENT DOCUMENTS

| | | | |
|---|---|---|---|
| 10,079,963 B1* | 9/2018 | Liu | H04N 5/04 |
| 2002/0051118 A1* | 5/2002 | Takagi | G02B 27/0172 |
| | | | 348/E13.047 |
| 2005/0018911 A1* | 1/2005 | Deever | H04N 19/126 |
| | | | 375/E7.14 |
| 2016/0198949 A1* | 7/2016 | Spitzer | G02B 27/0172 |
| | | | 351/204 |
| 2017/0199442 A1* | 7/2017 | Kim | G02B 26/0875 |
| 2018/0052501 A1* | 2/2018 | Jones, Jr. | G02B 27/017 |
| 2020/0043239 A1* | 2/2020 | Lee | G06F 3/0488 |
| 2020/0043391 A1* | 2/2020 | Maimone | G09G 3/001 |
| 2021/0092343 A1* | 3/2021 | Ji | H04N 13/339 |
| 2021/0271880 A1* | 9/2021 | Park | G06T 7/187 |
| 2021/0396574 A1* | 12/2021 | Paquet | G01J 3/0229 |

FOREIGN PATENT DOCUMENTS

| | | |
|---|---|---|
| CN | 108474939 A | 1/2018 |
| CN | 109194923 A | 1/2019 |
| CN | 109242943 A | 1/2019 |
| CN | 109886876 A | 6/2019 |
| CN | 109933268 A | 6/2019 |
| WO | 2010062481 A | 6/2010 |

OTHER PUBLICATIONS

Xin Zhang et al., Real-time foveation filtering using nonlinear Mipmap interpolation, Published Apr. 9, 2010, Springer-Verlag, 2010.
Zhonglei Yang, Gaze Effect Simulation Based on Eye Physiology, China Master's Theses Full-text Database, Jul. 15, 2011.
First Office Action of 2019101378903.
First Office Action of 201910138436X.
International search report of PCT/CN2020/076512.
Written opinion of PCT/CN2020/076512.

* cited by examiner

APPARATUS AND METHOD FOR NEAR-EYE DISPLAY BASED ON HUMAN VISUAL CHARACTERISTICS

CROSS-REFERENCE TO RELATED APPLICATIONS

This application is a bypass continuation of PCT Application No. PCT/CN2020/076512. This application claims priority from PCT Application No. PCT/CN2020/076512, filed Feb. 20, 2020 and CN Application No. 201910138436X and 2019101378903, both filed Feb. 25, 2019, the contents of which are incorporated herein in the entirety by reference.

TECHNICAL FIELD

The present disclosure relates to the field of display, and in particular, to apparatus and method for near-eye display based on human visual characteristics.

BACKGROUND

A near-eye display is a new type of display which forms a large field of view through an optical system, typically located near human eyes, and may be configured for a wearable near-eye display scene, such as a virtual/augmented reality headset or glasses. With a continuous increase in requirements of a virtual/augmented reality application for indexes of the display, such as a resolution and a refresh rate, a display system requires display data having an amount increased rapidly, and a transmission bandwidth of a current technology is unable to well meet a transmission requirement of the virtual/augmented reality application for the display data.

In consideration of great visual perception redundancy of a video image information source transmitted by a near-eye display system, a limited network bandwidth and terminal equipment are wasted by transmission and display of redundant information which is unperceivable by a human visual system. Therefore, transmitted image data may be reduced greatly by removal of the redundant information, thereby improving technical problems caused by the huge amount of transmitted video image data.

Since the same physical pixel pitch and the same driving method are adopted in each region of a panel of a conventional flat panel display, in a conventional image-data compression method, color parameters of human visual characteristics are considered more than spatial distribution characteristics of human eyes to reduce the redundant information.

SUMMARY

In view of this, an object of the present disclosure is to provide near-eye display method and apparatus based on human visual characteristics, thereby reducing a data transmission bandwidth. In terms of space, human eyes have a highest visual resolution in a direction of a visual center, and the resolution becomes less as a viewing angle increases. Thus, a control method of a near-eye display is conceived in the present disclosure, such that a high display quality is provided in a center of an image, a low display quality is provided at an edge of the image, and the display quality decreases progressively from a center to a periphery of spatial distribution, thereby reducing an amount of transmitted data.

In order to achieve the above-mentioned object, the present disclosure provides a near-eye display apparatus based on human visual characteristics, the apparatus including:

a near-eye display screen for displaying an image or images;

a dividing unit for dividing the near-eye display screen into n display subregions according to a human gaze point, wherein the display subregions accord with a human gaze effect and include a human gaze subregion located in a center;

a calculation unit for calculating critical spatial frequencies corresponding to the n display subregions respectively;

a creating unit for creating and rendering corresponding video image data of n layers for the n display subregions from an input video image according to the critical spatial frequencies corresponding to the n display subregions respectively;

a transmission unit for transmitting the video image data of the n layers to the near-eye display screen;

a reconstruction unit for performing reconstruction on and stitching the video image data of the n layers to generate an image which accords with the human gaze effect; and a display control unit for displaying the image which accords with the human gaze effect at the near-eye display screen.

Further, the human gaze effect includes:

a display effect with a relatively high amount of image information adopted in the human gaze subregion, a display effect with a relatively low amount of image information adopted in an edge subregion, and a display effect with image information having an amount between a highest amount and a lowest amount adopted in a middle subregion between the human gaze subregion and the edge subregion;

the amount of the image information is described by a spatial resolution and a bit number of a gray value of pixels of the image.

Further, the dividing unit further has functions of:

quantitatively or continuously dividing the near-eye display screen into n display subregions according to a retinal eccentricity from human eyes to the near-eye display screen;

enabling the n display subregions to include an annular subregion extending from the central human gaze subregion to an edge and/or a corner subregion without display contents; and forming a foveated image with a resolution and a detail according with the human visual characteristics by the n display subregions, and enabling the critical spatial frequency corresponding to each display subregion to decrease with an increase in the retinal eccentricity.

Further, the calculation unit includes:

a critical-spatial-frequency calculation subunit for calculating the critical spatial frequency according to an empirical formula or a human-eye model formula, wherein parameters of the empirical formula include the retinal eccentricity, a half-resolution eccentricity constant, a human-eye contrast sensitivity threshold and a spatial-frequency attenuation coefficient, and parameters of the human-eye model formula include the retinal eccentricity, a distance from the pixel to a gaze point and a configurable filter coefficient; and a critical-spatial-frequency setting subunit for setting the critical spatial frequency corresponding to each of the n display subregions as a maximum value of the critical spatial frequency corresponding to positions of all physical pixels in the display subregion or a certain fixed value close to the maximum value.

Further, the creating unit further includes:

a data selection subunit for acquiring video image data of corresponding positions of the n display subregions from the input video image according to physical positions of the n display subregions in the near-eye display screen;

a layer generating subunit for performing a downsampling filtering process on the video image data at the respective positions of the n display subregions in different proportions, so as to generate the video image data of the n layers, wherein an image spatial frequency of the video image data of each layer after the downsampling filtering process is equal or close to the critical spatial frequency corresponding to the display subregion; and a pixel smoothing subunit for accumulating low-order data of the pixel in the layer to a surrounding pixel.

Further, the n layers generated by the layer generating subunit may be described by an image pyramid, such as a Gaussian pyramid, a Laplacian pyramid, a differential pyramid or a mipmap pyramid, and are combined and stitched at a mapping plane of the image pyramid to form the foveated image presented at the near-eye display screen.

Further, the transmission unit sequentially transmits the video image data of the n layers to the near-eye display in different channels or in the same channel but at different times by means of wireless or wired communication, and the channel(s) are/is physical or logical.

Further, the reconstruction unit further includes:

a layer reconstruction subunit for performing reconstruction on the corresponding video image data of the n layers created and rendered by the creating unit respectively, such that the resolution and the gray value of the image are restored to a resolution and a gray value which correspond to the near-eye display screen;

a position analyzing subunit for reserving an overlap region between adjacent display regions and judging image data of the overlap region; and an image stitching subunit for mutually fusing images in the overlap region according to different weights and forming a complete picture.

Further, the layer reconstruction subunit has functions of image interpolation calculation, image resampling calculation, image enhancement calculation and pixel-bit expansion calculation, and the image stitching subunit has a function of bilateral filtering calculation.

Further, the near-eye display screen is configured as a microdisplay having a pixel density higher than 1000 PPI and including a semiconductor single-crystal-silicon substrate, and is observed by the human eyes through an optical system, and the microdisplay includes a silicon-based liquid crystal display, or a silicon-based organic light emitting display, or a silicon-based light emitting diode display, or a laser display or a digital micromirror display.

Further, the dividing unit, the calculation unit and the creating unit are located at a video-image-source generation end apart from or close to the human eyes, and the reconstruction unit, the display control unit and the near-eye display screen are close to the human eyes.

Further, the dividing unit, the calculation unit and the creating unit are implemented by software or hardware, the transmission unit, the reconstruction unit and the display control unit are implemented by hardware, the reconstruction unit is located in an independent hardware module or in the same module as the display control unit and the near-eye display screen, and the independent hardware module is connected with the display control unit through a high-speed signal interface.

Further, an eyeball tracking module is also included for acquiring the monocular or binocular gaze point in real time, transferring information of the gaze point to the dividing unit, the calculation unit, the creating unit, the transmission unit, the reconstruction unit and/or the display control unit in real time, and dividing the screen into the display subregions according to the real-time monocular or binocular gaze point.

Further, the eyeball tracking module includes a submodule for tracking according to eyeballs and a feature change around the eyeballs, or a submodule for tracking according to an angle change of an iris, or a submodule for tracking by actively projecting an infrared beam to the iris and then extracting a feature.

Further, the near-eye display screen has a function of displaying two independent images for the left and right eyes of a person respectively, or includes two independent screens for the left and right eyes of a person respectively, and both the independent image and the independent screen may be divided into a plurality of display subregions including the human gaze subregion respectively.

In order to achieve the above-mentioned object, the present disclosure further provides a near-eye display method based on human visual characteristics, the method including:

dividing a near-eye display screen into n display subregions according to a human gaze point, wherein the display subregions include a human gaze subregion located in a center;

acquiring critical spatial frequencies corresponding to the n display subregions respectively;

creating and rendering corresponding video image data of n layers for the n display subregions from an input video image according to the critical spatial frequencies corresponding to the n display subregions respectively;

transmitting the video image data of the n layers to the near-eye display; and performing reconstruction on and stitching the video image data of the n layers to generate an image which accords with the human gaze effect, and displaying the image in the near-eye display screen.

Further, the human gaze effect at least includes:

a display effect with a relatively high amount of image information adopted in the human gaze subregion, a display effect with a relatively low amount of image information adopted in an edge subregion, and a display effect with image information having an amount between a highest amount and a lowest amount adopted in a middle subregion between the human gaze subregion and the edge subregion;

the amount of the image information is described by a spatial resolution and a bit number of a gray value of pixels of the image.

Further, the n display subregions are quantitatively or continuously divided according to a retinal eccentricity from human eyes to the near-eye display screen, and include an annular subregion extending from the human gaze subregion to an edge and/or a corner subregion without display contents.

Further, a foveated image with a resolution and a detail according with the human visual characteristics is formed by the n display subregions, and the critical spatial frequency corresponding to each display subregion decreases with an increase in the retinal eccentricity.

Further, the foveated image is obtained with a geometric mapping method, a filtering method or a hierarchical method, and corresponds to the n layers, and the n layers may be described by an image pyramid and are combined and stitched at a mapping plane of the image pyramid to form the foveated image presented at the near-eye display screen.

Further, the image pyramid is configured as one of a Gaussian pyramid, a Laplacian pyramid, a differential pyramid and a mipmap pyramid.

Further, the critical spatial frequency is obtained according to an empirical formula or a human-eye model formula, parameters of the empirical formula include the retinal eccentricity, a half-resolution eccentricity constant, a human-eye contrast sensitivity threshold and a spatial-frequency attenuation coefficient, and parameters of the human-eye model formula include the retinal eccentricity, a distance from the pixel to a gaze point and a configurable filter coefficient.

Further, the step of acquiring the critical spatial frequencies corresponding to the n display subregions respectively includes; setting the critical spatial frequency corresponding to each of the n display subregions as a maximum value of the critical spatial frequency corresponding to positions of all physical pixels in the display subregion or a certain fixed value close to the maximum value.

Further, the step of creating and rendering the corresponding video image data of the n layers includes:

acquiring video image data of corresponding positions of the n display subregions from the input video image according to physical positions of the n display subregions in the near-eye display screen;

performing a downsampling filtering process on the video image data at the respective positions of the n display subregions in different proportions, so as to generate the video image data of the n layers, wherein an image spatial frequency of the video image data of each layer after the downsampling filtering process is equal or close to the critical spatial frequency corresponding to the display subregion; and acquiring downsampling coefficients of the video image data of the n layers.

Further, the step of creating and rendering the corresponding video image data of the n layers includes a step of accumulating low-order data of the pixel to a surrounding pixel, thereby decreasing a number of bits of pixel data.

Further, the video image data of the n layers is sequentially transmitted to the near-eye display in different channels or in the same channel but at different times by means of wireless or wired communication, and the channel(s) are/is physical or logical.

Further, the step of performing reconstruction on and stitching the video image data of the n layers includes:

performing reconstruction on the video image data of the corresponding n layers, such that the resolution and the gray value of the image are restored to a resolution and a gray value which correspond to the near-eye display screen; and reserving an overlap region between adjacent display regions for stitching multi-resolution images, wherein the step of reserving the overlap region includes the steps of judging image data in the overlap region, mutually fusing the images in the overlap region according to different weights and forming a complete picture.

Further, the step of reconstruction and stitching includes image interpolation calculation, image resampling calculation, image enhancement calculation, bilateral filtering calculation and pixel-bit expansion calculation.

Further, a central point of the human gaze subregion is obtained in real time in an eyeball tracking mode, and a time delay for obtaining the displayed image of the near-eye display from the central point is not perceived by a person.

Further, the eyeball tracking process includes a process of tracking according to eyeballs and a feature change around the eyeballs, or a process of tracking according to an angle change of an iris, or a process of tracking by actively projecting an infrared beam to the iris and then extracting a feature.

Further, the near-eye display screen has a function of displaying two independent images for the left and right eyes of a person respectively, or includes two independent screens for the left and right eyes of a person respectively, and both the independent image and the independent screen may be divided into a plurality of display subregions including the human gaze subregion respectively.

Compared with a prior art, the technical solution of the present disclosure has the following apparent substantive characteristics and remarkable progress.

(1) With the near-eye display apparatus according to the present disclosure, the amount of the data transmitted to the near-eye display from an image source is reduced greatly, thereby reducing the transmission bandwidth, supporting a higher display resolution and a higher refresh rate, and reducing system power consumption.

(2) A data compression method and a data restoration method of the near-eye display apparatus according to the present disclosure conform to spatial distribution characteristics of human eyes, with a high compression efficiency, a small data calculation amount and a good image restoration effect; meanwhile, a dizzy phenomenon may be relieved.

(3) In the present disclosure, various channel transmission modes, such as a wired channel transmission mode and a wireless channel transmission mode, are provided, such that transmission is more flexible.

(4) In the present disclosure, an eyeball tracking solution is provided to control the gaze point in real time, with a higher practicability.

(5) In the present disclosure, a solution of a monocular near-eye display and a binocular near-eye display is provided, with a higher practicability.

DETAILED DESCRIPTION

The technical solutions in the embodiments of the present disclosure will be clearly and completely described hereinafter in combination with the accompanying drawings. Apparently, these embodiments described herein are merely parts of the embodiments of the present disclosure rather than all the embodiments. Based on the embodiments of the present disclosure, any other embodiments obtained by a person skilled in the art without any creative effort shall fall within the protection scope of the present disclosure.

First Embodiment

Figure 1:
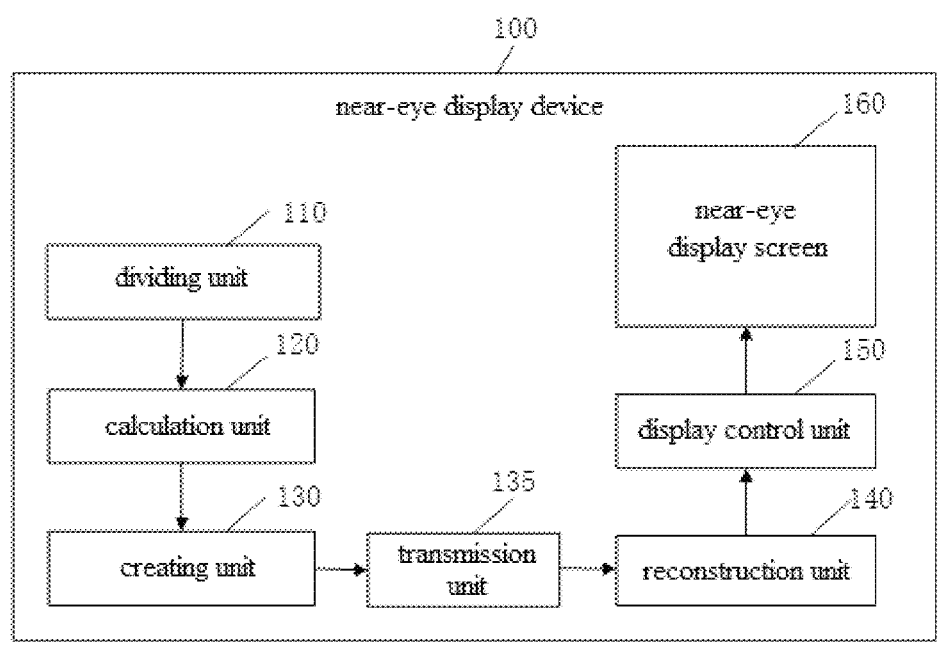
FIG. 1 is a block diagram of a apparatus according to a first embodiment of the present disclosure.

FIG. 1 shows a block diagram according to a first embodiment of the present disclosure. A near-eye display apparatus 100 includes:

a dividing unit 110 for dividing a near-eye display screen into n display subregions according to a human gaze point, wherein the display subregions accord with a human gaze effect and include a human gaze subregion in a center;

a calculation unit 120 for calculating critical spatial frequencies corresponding to the n display subregions respectively;

a creating unit 130 for creating and rendering corresponding video image data of n layers for the n display subregions from an input video image according to the critical spatial frequencies corresponding to the n display subregions respectively;

a transmission unit 135 for transmitting the video image data of the n layers to the near-eye display screen;

a reconstruction unit 140 for performing reconstruction on and stitching the video image data of the n layers to generate an image which accords with the human gaze effect;

a display control unit 150 for displaying the image which accords with the human gaze effect at the near-eye display screen; and the near-eye display screen 160 for displaying the image.

Further, the above-mentioned human gaze effect specifically refers to: a display effect with a high (or highest) amount of image information adopted in the human gaze subregion, a display effect with a low (or lowest) amount of image information adopted in an edge subregion apart from the human gaze subregion, and a display effect with image information having an amount between the high (or highest) amount and the low (or lowest) amount adopted in a middle subregion between the human gaze subregion and the edge subregion. Specifically, the amount of the image information is represented by a number of pixels and a bit number of a gray value of the pixels of the image; for example, 24-30 bits color data or 8-10 bits monochrome data is adopted for the central human gaze subregion, 10-18 bits color data or 3-6 bits monochrome data is adopted for the edge subregion apart from the human gaze subregion, so as to represent a gray level of the image, and the bit number of the data is reduced with an increase in a distance from the human gaze subregion.

According to the technical solution of the present embodiment, with the critical spatial frequency, high-resolution reality display is kept in the human gaze region, and low-resolution image display is adopted in the sight edge region, so as to simulate the human gaze effect, which guarantees user experiences while reducing a transmission amount.

The technical solution and the beneficial effects of the present embodiment will be further explained below more clearly.

Figure 2:
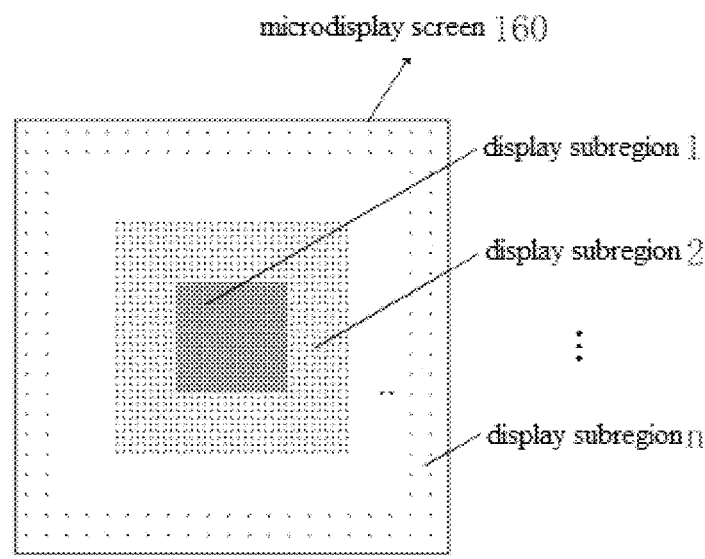
FIG. 2 is a schematic diagram of display subregions of a near-eye display screen.

Referring to FIG. 2, the near-eye display screen 160 is divided into n display subregions by the dividing unit 110, and n is an integer greater than 1. Different display subregions correspond to the video image data having different resolutions. The near-eye display screen is quantitatively or continuously divided into the n display subregions by the dividing unit according to a retinal eccentricity from human eyes to the near-eye display screen, the n display subregions contain the central human gaze region and square or rectangular annular regions extending from the center to an edge, the square or rectangular annular regions are not required to have an equal width, but the width of each square or rectangular annular region at least contains one pixel; the number and size of the display subregion are configured according to requirements of a user; quantitative division indicates that the division of the display 160 is a quantization process, and a limited number of divided regions are adopted, thus simplifying the dividing process and the operation process; continuous division may achieve an optimal match degree with the human eyes. A foveated image with a resolution and a detail according with human visual characteristics is formed by the n display subregions, and the critical spatial frequency corresponding to each display subregion decreases with an increase in the retinal eccentricity.

It is obvious that the dividing methods described here are only one of all the dividing methods that represent the idea in present disclosure.

Figure 3:
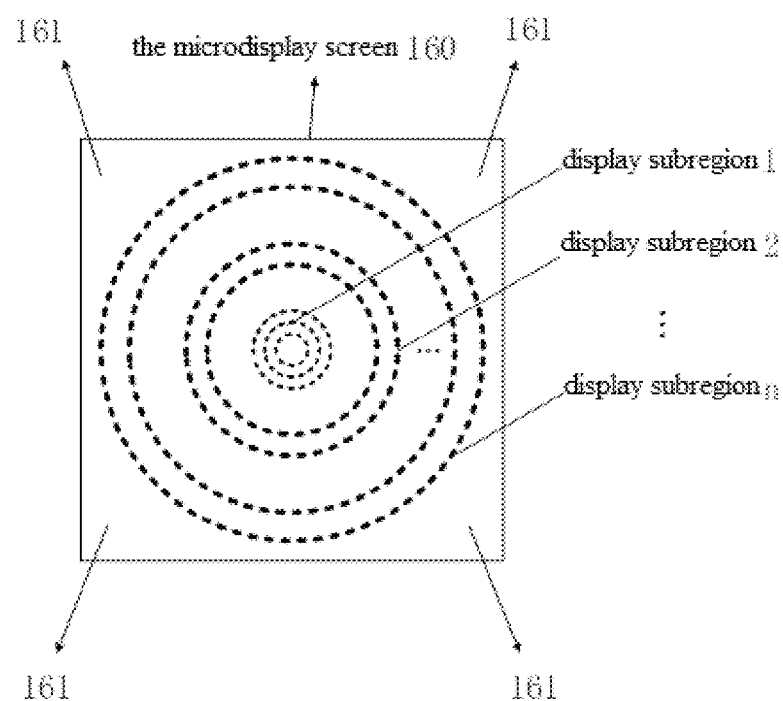
FIG. 3 is a schematic diagram of display subregions of another near-eye display screen.

FIG. 3 shows another technical solution of the present embodiment, which is substantially the same as the above-mentioned first dividing method, and is characterized in that the near-eye display screen 160 is divided into the n display subregions by the dividing unit 110, the n display subregions contain the circular or oval central human gaze region and circular or oval annular regions extending from the center to the edge, the circular or oval annular regions are not required to have an equal width, but the width of each circular or oval annular region at least contains one pixel; the number and size of the display subregion are configured according to requirements of a user. In particular, when a circular eyepiece is aligned with the near-eye display, the video image data is not required to be transmitted at four corners 161 of the display screen, thereby further reducing the amount of transmitted data.

Second Embodiment

In the present embodiment, operation modes of the calculation unit 120, the creating unit 130 and the reconstruction unit 140 are further detailed on the basis of the first embodiment.

Figure 4:
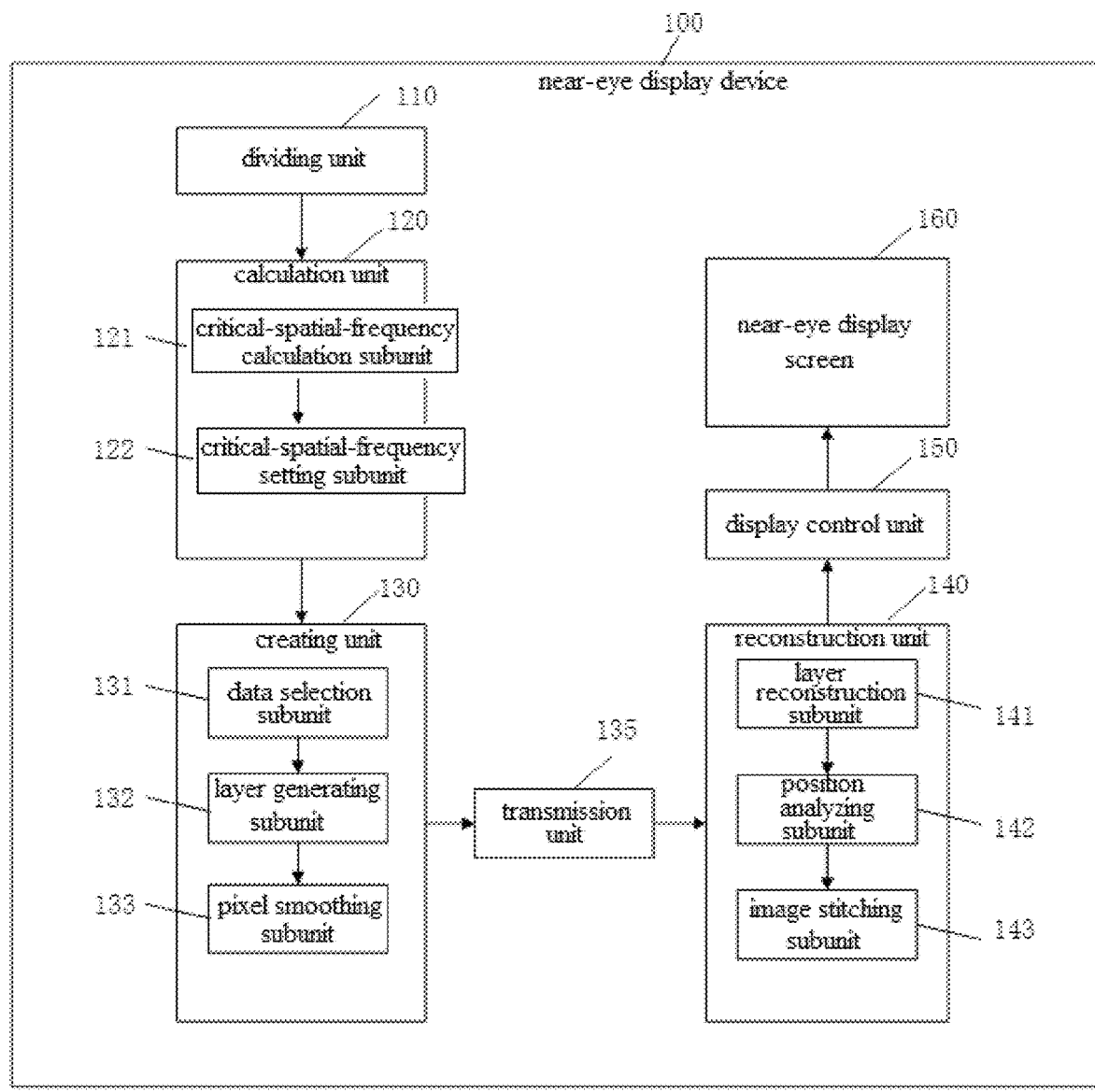
FIG. 4 is a block diagram of another embodiment of the present disclosure.

FIG. 4 shows a more detailed block diagram of a near-eye display apparatus according to the present disclosure, and the near-eye display apparatus 100 includes:

a dividing unit 110 for dividing a near-eye display screen into n display subregions according to a human gaze point, wherein the display subregions accord with a human gaze effect and include a human gaze subregion in a center;

a calculation unit 120 for calculating critical spatial frequencies corresponding to the n display subregions respectively;

a creating unit 130 for creating and rendering corresponding video image data of n layers for the n display subregions from an input video image according to the critical spatial frequencies corresponding to the n display subregions respectively;

a transmission unit 135 for transmitting the video image data of the n layers to the near-eye display screen;

a reconstruction unit 140 for performing reconstruction on and stitching the video image data of the n layers to generate an image which accords with the human gaze effect;

a display control unit 150 for displaying the image which accords with the human gaze effect at the near-eye display screen; and the near-eye display screen 160 for displaying the image.

Further, the calculation unit 120 further includes a critical-spatial-frequency calculation subunit 121 and a critical-spatial-frequency setting subunit 122.

Further, the creating unit 130 further includes a data selection subunit 131, a layer generating subunit 132 and a pixel smoothing subunit.

Further, the reconstruction unit 140 further includes a layer reconstruction subunit 141, a position analyzing subunit 142 and an image stitching subunit 143.

Each subunit is further explained below.

The critical-spatial-frequency calculation subunit 121 is configured to calculate the critical spatial frequency according to an empirical formula or a human-eye model formula, parameters of the empirical formula include the retinal eccentricity, a half-resolution eccentricity constant, a human-eye contrast sensitivity threshold and a spatial-frequency attenuation coefficient, and parameters of the human-eye model formula include the retinal eccentricity, a distance from the pixel to a gaze point and a configurable filter coefficient.

The critical-spatial-frequency setting subunit 122 is configured to set the critical spatial frequency corresponding to each of the n display subregions as a maximum value of the critical spatial frequency corresponding to positions of all physical pixels in the display subregion or a certain fixed value close to the maximum value.

The data selection subunit 131 is configured to acquire video image data of corresponding positions of the n display subregions from the input video image according to physical positions of the n display subregions in the near-eye display screen.

The layer generating subunit 132 is configured to perform a downsampling filtering process on the video image data at the respective positions of the n display subregions in different proportions, so as to generate the video image data of the n layers, and an image spatial frequency of the video image data of each layer after the downsampling filtering process is equal or close to the critical spatial frequency corresponding to the display subregion. In particular, the n layers generated by the layer generating subunit may be described by an image pyramid, such as a Gaussian pyramid, a Laplacian pyramid, a differential pyramid or a mipmap pyramid, and are combined and stitched at a mapping plane of the image pyramid to form the foveated image presented at the near-eye display screen.

The pixel smoothing subunit 133 is configured to accumulate low-order data of the pixel in the layer to a surrounding pixel. An example is explained below. Low-q-bit data of a s-bit pixel with a coordinate position of (x, y) is accumulated onto a pixel with a coordinate position of (x+1, y) or (x, y+1), such that the s-bit pixel is represented by s-q bits, and the low-q-bit data at the coordinate position of (x, y) and an original value of the pixel with the coordinate position of (x+1, y) or (x, y+1) are accumulated to form a new pixel value. The process is repeated until calculation of all the pixels in the current display subregion are completed. The display subregion is represented by the s-q bits. In other examples, surrounding pixels may have varied positions, but a method of accumulation is not changed.

The layer reconstruction subunit 141 is configured to perform reconstruction on the corresponding video image data of the n layers created and rendered by the creating unit respectively, such that the resolution and the gray value of the image are restored to a resolution and a gray value which correspond to the near-eye display screen; specifically, the layer reconstruction subunit 141 has functions of image interpolation calculation, image resampling calculation, image enhancement calculation and pixel-bit expansion calculation.

The position analyzing subunit 142 is configured to reserve an overlap region between adjacent display regions and judge image data of the overlap region.

The image stitching subunit 143 is configured to mutually fuse images in the overlap region according to different weights and form a complete picture; further, the image stitching subunit 143 further has a function of bilateral filtering calculation.

The present embodiment provides more detailed components of the near-eye display apparatus than the first embodiment.

Third Embodiment

The present embodiment is substantially the same as the second embodiment, and characterized in that:

the critical-spatial-frequency calculation subunit 121 and the critical-spatial-frequency setting subunit 122 included in the calculation unit 120 may operate in parallel or series in any serial order;

the data selection subunit 131, the layer generating subunit 132 and the pixel smoothing subunit included in the creating unit 130 may operate in parallel or series in any serial order; and the layer reconstruction subunit 141, the position analyzing subunit 142 and the image stitching subunit 143 included in the reconstruction unit 140 may operate in parallel or series in any serial order.

Fourth Embodiment

Figure 5:
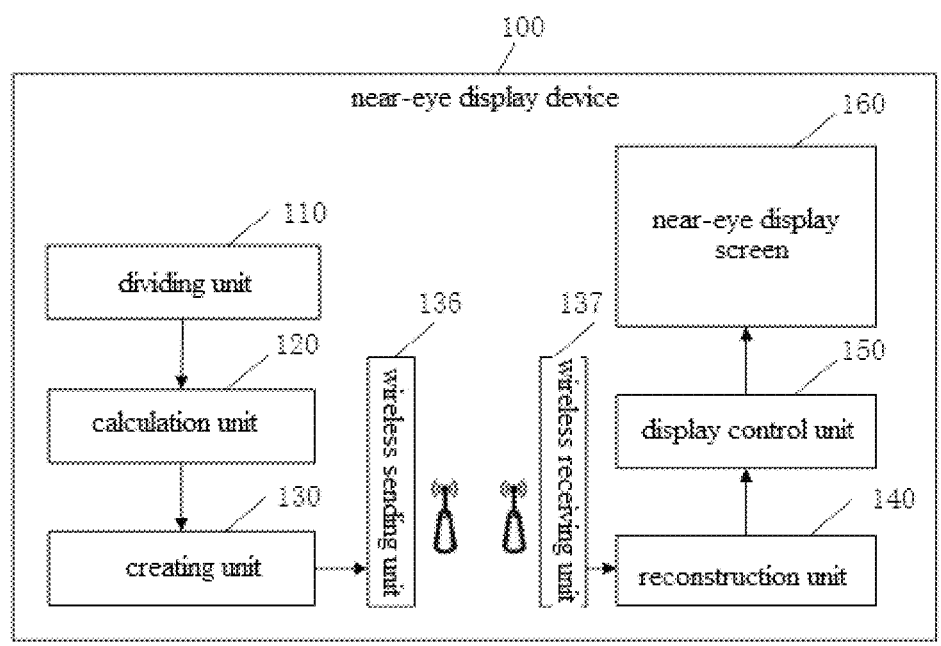
FIG. 5 is a block diagram of still another embodiment of the present disclosure.

The present embodiment is substantially the same as the first and second embodiments of the present disclosure, and characterized in that:

FIG. 5 shows a block diagram of a near-eye display apparatus according to the present embodiment, the transmission unit 135 in the near-eye display apparatus 100 includes a wireless sending unit 136 and a wireless receiving unit 137, and the corresponding video image data of the n layers created for the n display subregions respectively is transmitted using a wireless transmission protocol. The wireless sending unit 136 is configured to wirelessly transmit the video image data of each display subregion created by the creating unit 130 and downsampling proportionality coefficients of the n layers corresponding to the display subregions, and the wireless receiving unit 137 is configured to receive the video image data of each display subregion and the downsampling proportionality coefficients of the n layers sent by the wireless sending unit 160, and transmit the received video image data and the downsampling proportionality coefficients to the reconstruction unit 140. The wireless transmission protocol includes IEEE 802.15.4, 802.11a/b/g/n, Bluetooth, UWB (Ultra Wide Band), or the like, and is not specifically specified in the present disclosure.

In another technical solution, the transmission unit 135 transmits the video image data of the n layers from the creating unit 130 to the reconstruction unit 140 based on wired communication.

By means of the above-mentioned wireless or wired transmission, the n layers are sequentially transmitted to the near-eye display in different channels or in the same channel but at different times, and the channel(s) are/is physical or logical.

With the technical solution of the present embodiment, a bandwidth of data transmission is reduced on the premise of guaranteeing the human gaze effect of the user. With the critical spatial frequency, high-resolution reality display is kept in the human gaze region, and low-resolution image display is adopted in the sight edge region. The low bandwidth characteristic of the technical solution makes the solution suitable for the field of wireless or wired transmission of digital video images.

Fifth Embodiment

Figure 6A:
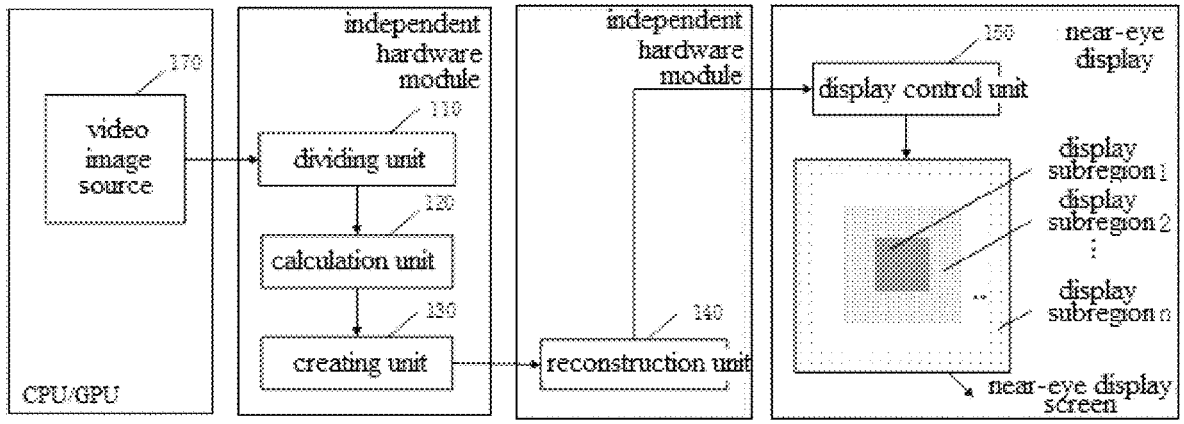
FIG. 6A is a block diagram of yet another embodiment of the present disclosure.
Figure 6B:
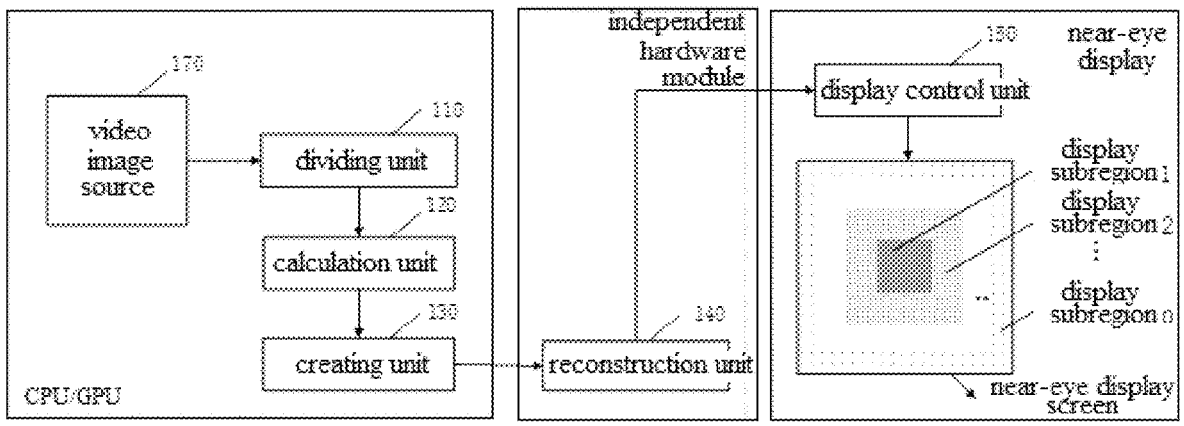
FIG. 6B is a block diagram of yet another embodiment of the present disclosure.
Figure 6C:
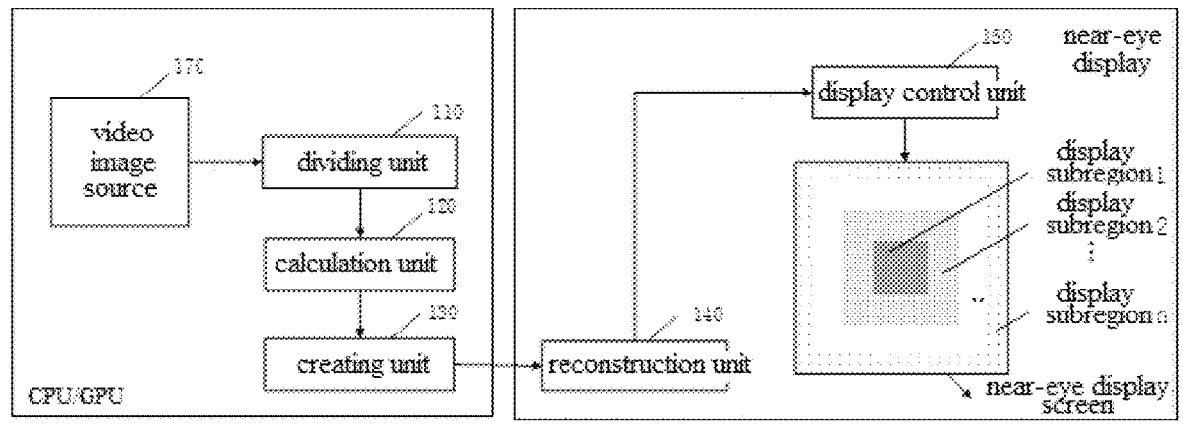
FIG. 6C is a block diagram of yet another embodiment of the present disclosure.

Referring to FIGS. 6A-6C, the near-eye display apparatus 100 according to the present embodiment further includes a video image source 170 provided by a CPU/GPU or other image generating apparatus in a computer, a data server, a mobile phone, a video player, other embedded systems, or the like, and the video image data of the video image source 170 is transmitted to the near-eye display screen 160 via the dividing unit 110, the calculation unit 120, the creating unit 130, the reconstruction unit 140 and the display control unit 150.

The dividing unit 110 divides the near-eye display screen into n display subregions according with a human gaze effect according to a human gaze point, the calculation unit 120 calculate the critical spatial frequency according to an empirical formula or a human-eye model formula, parameters of the empirical formula include a retinal eccentricity, a half-resolution eccentricity constant, a human-eye contrast sensitivity threshold and a spatial-frequency attenuation coefficient, and parameters of the human-eye model formula include the retinal eccentricity, a distance from a pixel to the gaze point and a configurable filter coefficient; the calculation unit 120 sets the critical spatial frequency corresponding to each of the n display subregions as a maximum value of the critical spatial frequency corresponding to positions of all physical pixels in the display subregion or a certain fixed value close to the maximum value. The creating unit 130 acquires the video image data of corresponding positions of the n display subregions from an input video image according to physical positions of the n display subregions in the near-eye display screen, and performs a downsampling filtering process on the video image data at the respective positions of the n display subregions in different proportions, so as to generate the video image data of the n layers, and an image spatial frequency of the video image data of each layer after the downsampling filtering process is equal or close to the critical spatial frequency corresponding to the display subregion. In particular, the n layers generated by the layer generating subunit may be described by an image pyramid, such as a Gaussian pyramid, a Laplacian pyramid, a differential pyramid or a mipmap pyramid, and are combined and stitched at a mapping plane of the image pyramid to form the foveated image presented at the near-eye display screen; the creating unit 130 further accumulates low-order data of the pixel in the layer to a surrounding pixel.

The video image data of the n layers generated by the creating unit 130 is sequentially transmitted to the reconstruction unit 140 in different channels or in the same channel but at different times wirelessly or with wires.

The reconstruction unit 140 performs reconstruction on the created and rendered corresponding video image data of the n layers respectively, such that the resolution and the gray value of the image are restored to a resolution and a gray value which correspond to the near-eye display screen; specifically, the layer reconstruction subunit 141 has functions of image interpolation calculation, image resampling calculation, image enhancement calculation and pixel-bit expansion calculation; the reconstruction unit 140 reserves an overlap region between adjacent display regions, judges image data of the overlap region, mutually fuses images in the overlap region according to different weights, and forms a complete picture; further, the image stitching subunit 143 further has a function of bilateral filtering calculation.

In particular, as shown in FIG. 6A, the dividing unit 110, the calculation unit 120 and the creating unit 130 are configured as independent hardware modules, the video image source 170 is implemented by software, and the independent hardware modules are connected with the video image source 170 by external signal lines; the reconstruction unit 140, the display control unit 150 and the near-eye display screen 160 are close to human eyes, the reconstruction unit 140 is configured as an independent hardware module, and the display control unit 150 and the near-eye display screen 160 are integrated in the near-eye display. As shown in FIG. 6B, the dividing unit 110, the calculation unit 120 and the creating unit 130 are located at the video image source 170 side, and the dividing unit 110, the calculation unit 120, the creating unit 130 and the video image source 170 are all implemented by software; the reconstruction unit 140, the display control unit 150 and the near-eye display screen 160 are close to human eyes, the reconstruction unit 140 is configured as an independent hardware module, and the display control unit 150 and the near-eye display screen 160 are located in the near-eye display. As shown in FIG. 6C, the dividing unit 110, the calculation unit 120 and the creating unit 130 are located at the video image source 170 side, and the dividing unit 110, the calculation unit 120, the creating unit 130 and the video image source 170 are all implemented by software; the reconstruction unit 140, the display control unit 150 and the near-eye display screen 160 are close to human eyes, and the reconstruction unit 140, the display control unit 150 and the near-eye display screen 160 are all integrated in the near-eye display. In the above-mentioned example, the creating unit 130 is connected with the reconstruction unit 140 by the transmission unit 135. Wired or wireless transmission is adopted in the transmission unit 135.

Sixth Embodiment

The present embodiment is substantially the same as the first to fifth embodiments, and is characterized in that the near-eye display screen 160 is configured as a microdisplay having a pixel density higher than 1000 PPI and including a semiconductor single-crystal-silicon substrate, and is observed by the human eyes through an optical system, and the microdisplay includes a silicon-based liquid crystal display, or a silicon-based organic light emitting display, or a silicon-based light emitting diode display, or a laser display or a digital micromirror display.

Seventh Embodiment

Figure 7:
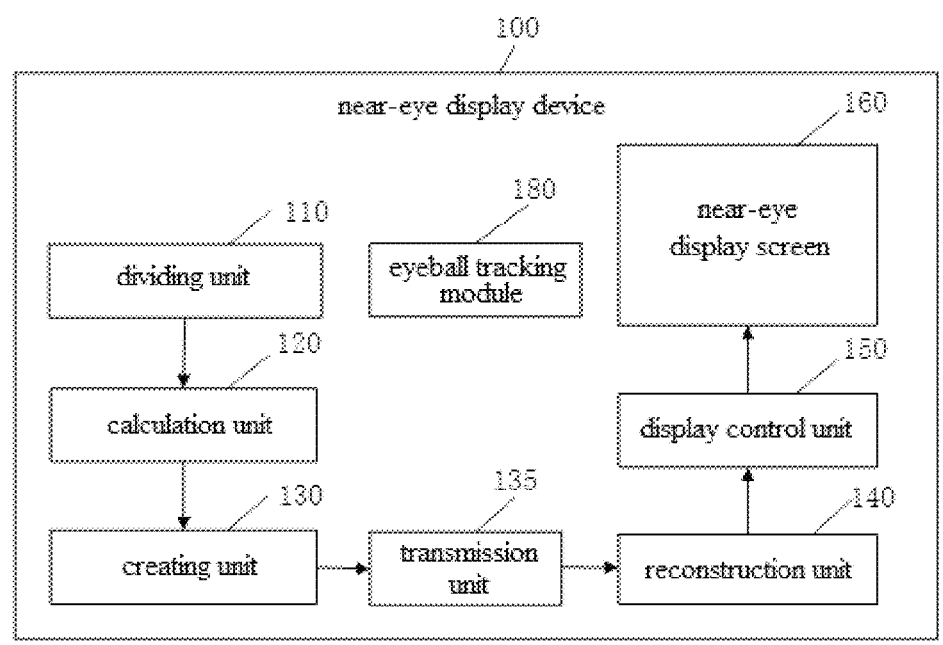
FIG. 7 is a block diagram of yet another embodiment of the present disclosure.

Referring to FIG. 7, in the present embodiment, on the basis of the first to sixth embodiments, an eyeball tracking module 180 is additionally provided in the near-eye display apparatus 100, for acquiring the monocular or binocular gaze point in real time, transferring information of the gaze point to the dividing unit, the calculation unit, the creating unit, the transmission unit, the reconstruction unit and/or the display control unit in real time, and dividing the screen into the display subregions according to the real-time monocular or binocular gaze point.

Further, the eyeball tracking module 180 is located at the near-eye display screen side, so as to capture positions of human eyes more accurately. In particular, the eyeball tracking module 180 operates independently of the dividing unit 110, the calculation unit 120, the creating unit 130, the transmission unit 135, the reconstruction unit 140, the display control unit 150 and the near-eye display screen 160.

Further, a time delay for obtaining a displayed image of the near-eye display from the human gaze point is not perceived by a person.

Further, the eyeball tracking module includes a submodule for tracking according to eyeballs and a feature change around the eyeballs, or a submodule for tracking according to an angle change of an iris, or a submodule for tracking by actively projecting an infrared beam to the iris and then extracting a feature.

Eighth Embodiment

Further, in the present embodiment, the near-eye display screen 160 has a function of displaying two independent images for the left and right eyes of a person respectively, and the independent image may be divided into a plurality of display subregions including the human gaze subregion.

In another technical solution, the near-eye display screen 160 includes two independent screens for the left and right eyes of the person respectively, and the independent screen may be divided into a plurality of display subregions including the human gaze subregion. In the technical solution, the two independent screens may share the dividing unit 110, the calculation unit 120, the creating unit 130, the transmission unit 135, the reconstruction unit 140, and/or the display control unit 150, or an independent dividing unit 110, calculation unit 120, creating unit 130, transmission unit 135, reconstruction unit 140, and/or display control unit 150 may be used by the two independent screens.

In both of the above two technical solutions, the eyeball tracking module 180 may be combined to provide a more practical near-eye display apparatus.

Ninth Embodiment

Figure 12:
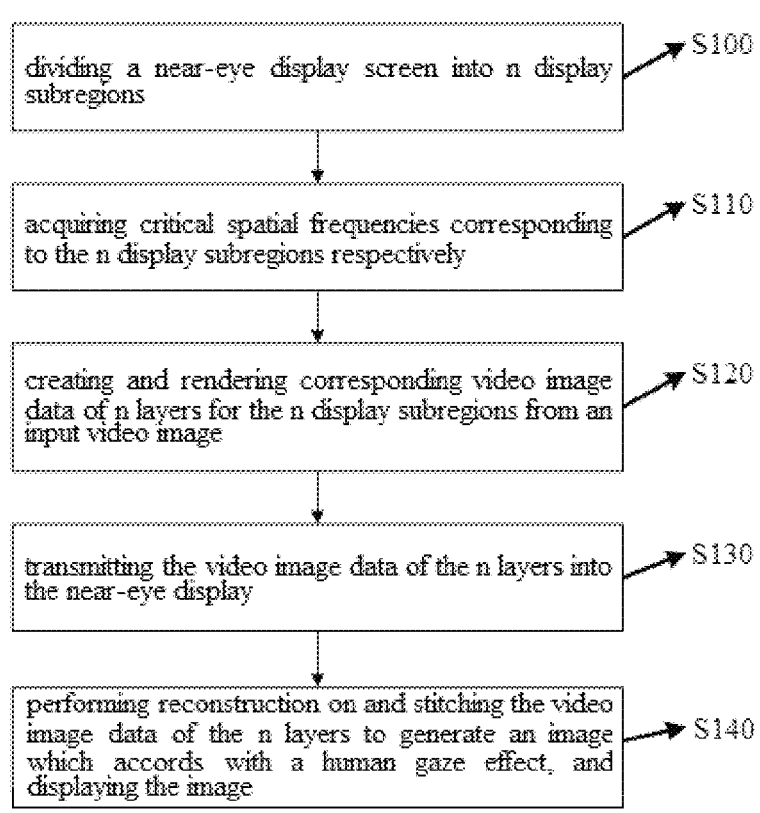
FIG. 12 is a flow chart of a method according to a ninth embodiment of the present disclosure.

FIG. 12 shows a flow chart of a near-eye display method according to the present disclosure, including the steps of:

step S100: dividing a near-eye display screen into n display subregions according to a human gaze point, wherein the display subregions include a human gaze subregion located in a center;

step S110: acquiring critical spatial frequencies corresponding to the n display subregions respectively;

step S120: creating and rendering corresponding video image data of n layers for the n display subregions from an input video image according to the critical spatial frequencies corresponding to the n display subregions respectively;

step S130: transmitting the video image data of the n layers to the near-eye display; and step S140: performing reconstruction on and stitching the video image data of the n layers to generate an image which accords with the human gaze effect, and displaying the image in the near-eye display screen.

The technical solution and the beneficial effects of the present embodiment will be further explained below more clearly.

FIG. 2 shows a schematic diagram of a first display subregions of the near-eye display screen of the above technical solution. The display screen 160 is divided into n display subregions, and n is an integer greater than 1. Corresponding video image data is created for the n display subregions from an input video image according to the critical spatial frequencies corresponding to the n display subregions respectively. Different display subregions correspond to the video image data having different resolutions. The display screen 160 is divided into the n display subregions according to quantitative results of retinal eccentricities from human eyes to the display subregions, the n display subregions at least contain the central human gaze region and square or rectangular annular regions extending from the center to an edge, the square or rectangular annular regions are not required to have an equal width, but the width of each square or rectangular annular region at least contains one pixel; the number and size of the display subregion are configured according to requirements of a user; quantitative division indicates that the division of the display 160 is a quantization process, and a limited number of divided regions are adopted, thus simplifying the dividing process and the operation process; continuous division may achieve an optimal match degree with the human eyes.

It is obvious that the dividing methods described here are only one of all the dividing methods that represent the idea in present disclosure.

FIG. 3 shows a schematic diagram of division of the near-eye display screen of another technical solution. The display screen 160 is divided into n display subregions, and n is an integer greater than 1. The dividing method is substantially the same as the above-mentioned first dividing method, and is characterized in that the near-eye display screen 160 is divided into the n display subregions according to a view of angle of the human eyes, the n display subregions at least contain the central human gaze region and circular or oval annular regions extending from the center to the edge, the circular or oval annular regions are not required to have an equal width, but the width of each circular or oval annular region at least contains one pixel; the number and size of the display subregion are configured according to requirements of a user. In particular, when a circular eyepiece is aligned with the near-eye display, the video image data is not required to be transmitted at four corners 161 of the display screen, thereby further reducing the amount of transmitted data.

With the above-mentioned method, a bandwidth of data transmission may be reduced on the premise of guaranteeing the human gaze effect. The pixel at the position of the human gaze point has a highest resolution perceived by the human eyes, and the resolutions perceived by the human eyes of the rest pixels are reduced with an increase in a pixel distance from the position of the human gaze point; the greater the pixel distance is, the less the resolution perceived by the human eyes is. Therefore, according to this feature, the display may achieve the human gaze effect. In particular, such a human gaze effect further includes: a display effect with a high (or highest) amount of image information adopted in the human gaze subregion, a display effect with a low (or lowest) amount of image information adopted in an edge subregion apart from the human gaze subregion, and a display effect with image information having an amount between the high (or highest) amount and the low (or lowest) amount adopted in a middle subregion between the human gaze subregion and the edge subregion.

Further, the amount of the image information is represented by a number of the pixels and a bit number of a gray value of the pixels of the image, which also means that the purpose of reducing the amount of transmitted data may be achieved by compressing both spatial data and the bit number of a gray level of the image; for example, 24-30-bit color data or 8-10-bit monochrome data is adopted for the central human gaze subregion, 10-18-bit color data or 3-6-bit monochrome data is adopted for the edge subregion apart from the human gaze subregion, so as to represent the gray level of the image, and the bit number of the data is reduced with an increase in a distance from the human gaze subregion.

According to the technical solution of the embodiment of the present disclosure, with the critical spatial frequency, high-resolution reality display is kept in the human gaze region, and low-resolution image display is adopted in the sight edge region, so as to simulate the human gaze effect, which guarantees user experiences.

Tenth Embodiment

A method of dividing the near-eye display screen into the n display subregions in step S100 in the ninth embodiment is further described in detail in the present embodiment.

First, a foveated image with a resolution and a detail according with human visual characteristics is formed by the n display subregions, such that the foveated image displayed at the screen corresponds to a fovea of a human retina, thereby keeping the resolution and the detail of the screen image consistent with a human eye model. In the foveated image, the critical spatial frequency corresponding to each display subregion decreases with an increase in the retinal eccentricity.

In particular, the foveated image may be obtained using a geometric mapping method, a filtering method and a hierarchical method. Detailed implementations are described below.

In the geometric mapping method, a geometric structure which is sampled non-uniformly is combined with a space-changed adaptive coordinate transformation; for example, with a log-polar mapping transformation method or a superpixel transformation method, an important target object in a sight center is mapped to a high-resolution region in the middle of coordinates, and an unimportant content is mapped to an image edge region, so as to form the foveated image.

In the filtering method, an image resampling process is implemented by a low-pass or band-pass filter, and selection of a cut-off frequency of the filter is determined by a local sampling density of the retina. A series of images are obtained after the filtering process is performed at different sampling frequencies by a finite group of filters, and stitched to obtain the foveated image.

In the hierarchical method, the input image is blurred to different degrees to construct an image pyramid which is mapped to obtain the foveated image. A method of blurring to different degrees includes a method of resampling (scaling) a spatial resolution of the image and a method of performing image processing on a color depth, or the like, of a pixel. For example, the foveated image is described using the image pyramid, such as a Gaussian pyramid, a Laplacian pyramid, a differential pyramid, a mixture Gaussian pyramid or a mipmap pyramid.

Figure 8:
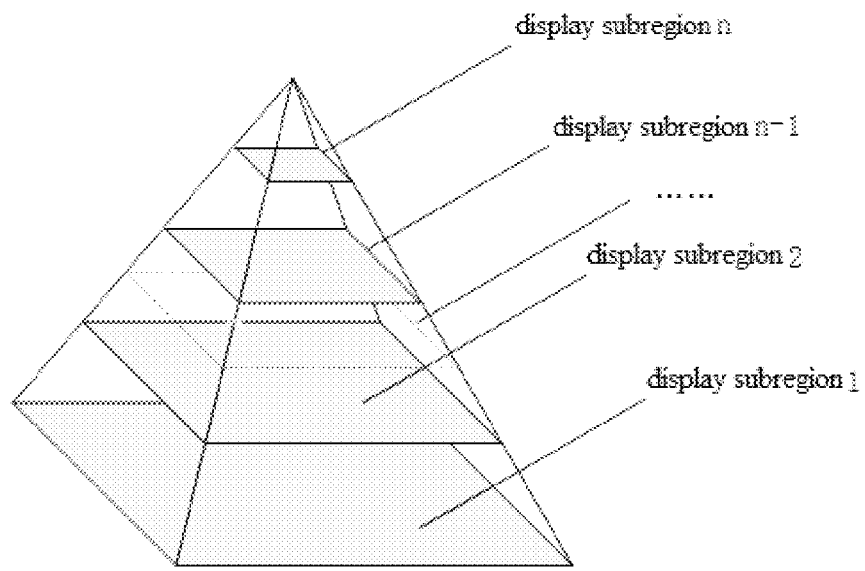
FIG. 8 is a schematic diagram of an image pyramid corresponding to n layers.

FIG. 8 shows a schematic diagram of an image pyramid corresponding to n layers, and the image pyramid describes n layers which are derived from the same image source, have resolutions reduced gradually from bottom to top and are arranged in a pyramid shape. The pyramid is configured as a Gaussian pyramid, a Laplacian pyramid, a differential Gaussian pyramid, a mixture Gaussian pyramid or a mipmap pyramid. In the Gaussian pyramid, the image is subjected to a Gaussian filtering process (or Gaussian convolution) and downsampled to form a group of images; in one example, the image is doubled and then subjected to the Gaussian filtering process, then the image generated by the Gaussian filtering process is downsampled, and as such, the steps are repeated in the image pyramid to obtain the n layers. Particularly, two adjacent images in the image pyramid are subjected to subtraction to obtain an interpolation image, and the differential Gaussian pyramid is obtained. Furthermore, the Laplacian pyramid may also be used for reconstructing a higher-layer image by upsampling a lower-layer image of the pyramid. These pyramids are used with the Gaussian pyramid. In another example, the image pyramid is generated with a mipmap texture mapping technology; for example, a relationship is established between a Gaussian kernel radius and a mipmap level m, thereby reducing a quantity of gaussian filtering operations.

Figure 9:
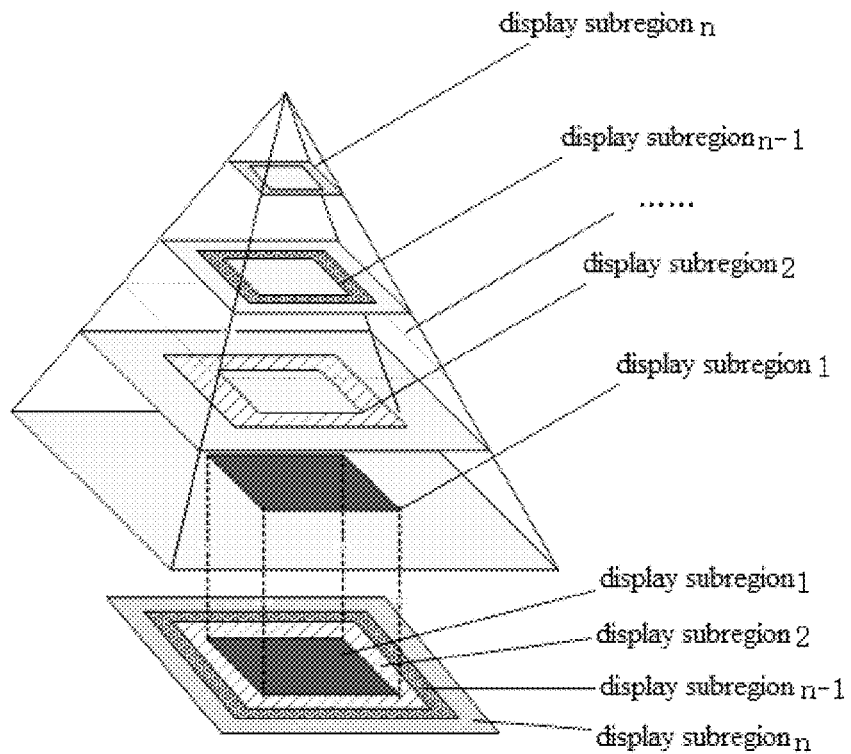
FIG. 9 is a schematic diagram in which a foveated image is synthesized by the image pyramid corresponding to the n layers.

FIG. 9 shows a foveated image synthesized by the image pyramid corresponding to the n layers. Each layer is used for representing one display subregion in the near-eye display screen, and the display subregions are combined and stitched at a mapping plane to form the foveated image presented at the near-eye display screen. It may be seen that portions in the image pyramid which are not synthesized into the foveated image will no longer be transmitted. In particular, the stitching process further includes a boundary filtering process, such that an image stitching position is smoother.

Eleventh Embodiment

A method of calculating the critical spatial frequency in the ninth embodiment is further described in detail in the present embodiment. The critical spatial frequency represents a maximum level of detail at which an object may be perceived by human eyes in the current region; that is, high-frequency signal information exceeding this frequency will not be perceived by the human eyes.

A process of calculating the critical spatial frequency by an empirical formula is shown in a first example.

First, a mathematical relationship is established between a human-eye contrast sensitivity corresponding to a position of a physical pixel in a specific display subregion and a spatial frequency of the display subregion, wherein a preferred solution of the relationship may be described by the following formulas (1) and (2):

$$CS(f, e) = \frac{1}{CT(f, e)} \quad (1)$$

$$CT(f, e) = CT_0 \exp\left(af \frac{e + e_2}{e_2}\right) \quad (2)$$

wherein $CS(f, e)$ is the human-eye contrast sensitivity, $CT(f, e)$ is a visual contrast threshold, f is the spatial frequency, e is a retinal eccentricity, $e_2$ is a half-resolution eccentricity constant, $CT_0$ is a human-eye contrast sensitivity threshold, and a is a spatial frequency attenuation coefficient. Further, a=0.05–0.25, $e_2$=2.0–3.0, and $CT_0$=1/128–1/16. In particular, when a=0.106, $e_2$=2.3 and $CT_0$=1/64, most of image requirements may be met, and the parameters are used for fitting a contrast sensitivity model.

Then, the human-eye contrast sensitivity CS(f, e) is set to a maximum value or a weighted average, wherein the maximum value is preferable, and the weighted average slightly less than the maximum value is also acceptable.

Finally, the spatial frequency calculated according to the formulas (1) and (2) is the critical spatial frequency.

Figure 10:
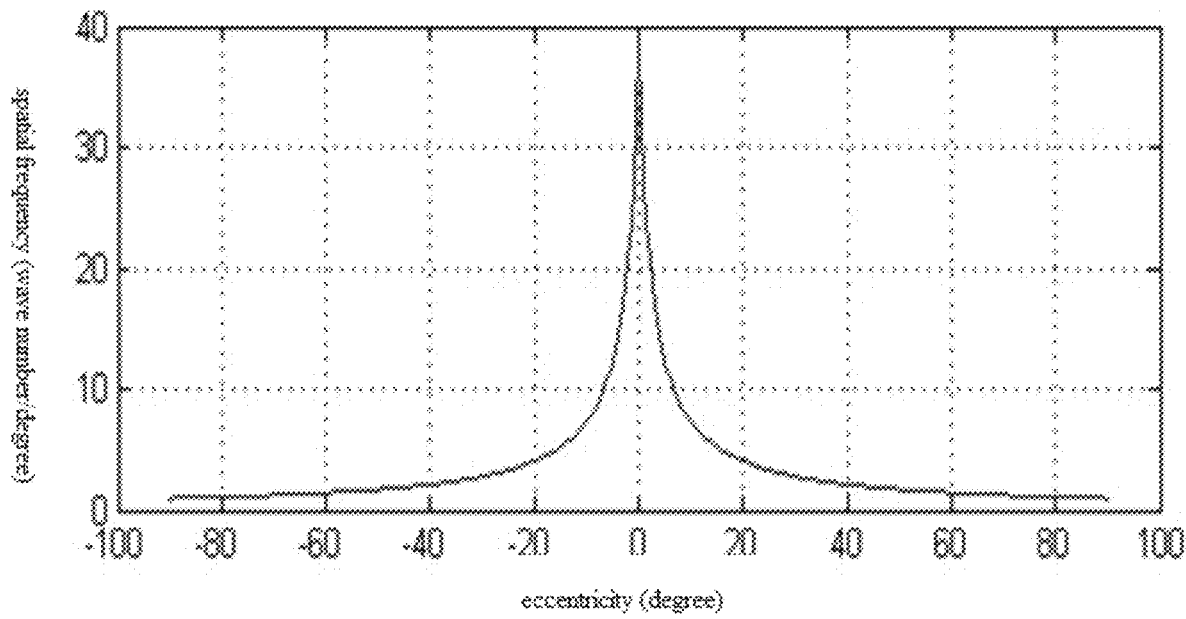
FIG. 10 is an example of a relationship between a retinal eccentricity and a critical spatial frequency.

FIG. 10 reflects a relationship between the retinal eccentricity and the critical spatial frequency calculated in the present embodiment, with the abscissa representing the retinal eccentricity and the ordinate representing the critical spatial frequency.

It should be noted that the formulas (1) and (2) represent preferred reciprocal and exponential relationships, but do not represent all functional relationships. When the human-eye contrast sensitivity CS(f, e) remains fixed, any mathematical relationship in which an increase in the retinal eccentricity e results in a decrease in the spatial frequency f may be adopted.

A process of calculating the critical spatial frequency by a human-eye model formula is shown in a second example.

First, an original image is subjected to a Gaussian filtering process using a Gaussian convolution function of 3×3 according to formula (3):

$$I_p(l+1) = G * I_p(l) = \omega_G \sum_{q \in \forall} G(q-p) I_q(l) \quad (3)$$

wherein I(l) represents a texture pyramid image of a layer 1, p represents a position of a fixed point, G is the Gaussian convolution function of 3×3 and includes Gaussian weights of adjacent pixels, V is eight adjacent pixels with the fixed point as a center, and $W_G$ is a reciprocal of a sum of weights of parts of the Gaussian function. The texture pyramid image of each layer is calculated starting from l=0.

Second, a length and a width of the image are changed into 1/1.5-1/10, preferably 1/2, of original values by a filtering downsampling mode, thereby establishing a texture pyramid.

Then, a corresponding angle value, i.e., an eccentricity, of the gaze point corresponding to each pixel is calculated according to formula (4):

$$e(v, x) = \arctan\left(\frac{d(x)}{Nv}\right) \quad (4)$$

wherein Nv is a distance from an observer to a gaze point plane, and d(x) is a distance from a pixel to the gaze point.

Finally, the spatial frequency is calculated according to formula (5), thereby removing a high-frequency signal in the image information using the Gaussian filtering process:

$$\sigma = \frac{d(x)}{e} \cdot \frac{1}{1.86 f_e} \quad (5)$$

wherein $f_c$ is the spatial frequency, σ is a Gaussian-filtering kernel radius (configurable filter coefficient), e is the retinal eccentricity, and d(x) is the distance from the pixel to the gaze point.

Figure 11:
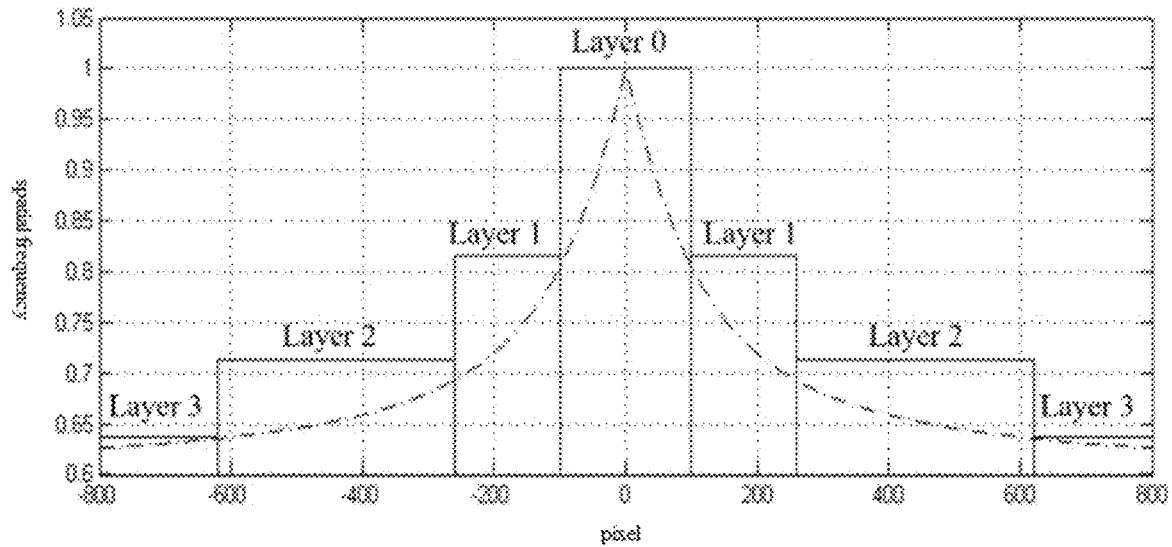
FIG. 11 is an example of a relationship between a pixel position and the critical spatial frequency.

FIG. 11 reflects a relationship between the pixel position and the critical spatial frequency calculated in the present embodiment, with the abscissa representing the pixel position at the plane, and the ordinate representing the critical spatial frequency; four layers are included in the present embodiment, and in other examples, more layers may be included to further reduce the amount of data of image transmission. The number of the layers depends on a speed of an operator, and the faster the operator is, the more the layers which may be supported are, and the greater the reduced amount of the data of the image transmission is.

Twelfth Embodiment

The step S110 of acquiring the critical spatial frequencies corresponding to the n display subregions respectively in the first embodiment is described in detail in the present embodiment, and includes:

setting the critical spatial frequency corresponding to the display subregion as a maximum value of the critical spatial frequency corresponding to positions of all physical pixels in the display subregion or a certain fixed value close to the maximum value. The fixed value means that a slightly lower image quality is used to provide greater data compression and a less data transmission bandwidth.

Thirteenth Embodiment

The step S120 of creating and rendering the corresponding video image data of the n layers in the ninth embodiment is described in detail in the present embodiment, and includes:

first, acquiring video image data of corresponding positions of the n display subregions from the input video image according to physical positions of the n display subregions in the near-eye display screen;

then, according to the critical spatial frequency of each display subregion, performing a downsampling filtering process on the video image data at the respective positions of the n display subregions in different proportions, so as to generate the video image data of the n layers, wherein an image spatial frequency of the video image data of each layer after the downsampling filtering process is equal or close to the critical spatial frequency corresponding to the display subregion, such that the downsampling filtering process is performed to compress data according to the critical spatial frequency acceptable to human eyes; it should be noted that the image spatial frequency after the downsampling filtering process may be less than the critical spatial frequency of the subregion, and an increased compression ratio is achieved by sacrificing the image quality slightly; and meanwhile, acquiring downsampling coefficients of the video image data of the n layers.

Furthermore, the filtering downsampling process includes a filtering downsampling process of the spatial resolution of the image and a downsampling process of the gray resolution of the image, with the former containing a process of taking a gray average of a plurality of pixels, and the later containing a process of accumulating low-order gray values of the pixels to peripheral pixels, thereby decreasing a number of bits of the pixels. In particular, the step of creating and rendering the corresponding video image data of the n layers includes a process of accumulating the low-order data of the pixel to the surrounding pixel, thereby decreasing the number of the bits of pixel data.

Further, the downsampling filtering process may be performed using foveated calculation of the image, which includes a process of filtering the human gaze subregion with a less downsampling coefficient and filtering the subregion apart from the human gaze subregion with a greater downsampling coefficient, so as to compress more image information. Further, the geometric mapping method, the filtering method or the hierarchical method may be adopted in the foveated calculation, and the foveated calculation includes mathematical operations, such as wavelet transformation, Gaussian filtering, convolution, quantization, texture pyramids (including the mipmap pyramid), data compression, and/or gray dither, or the like. In particular, the foveated calculation method is as in the third example.

Fourteenth Embodiment

The step S130 of transmitting the video image data of the n layers to the near-eye display in the ninth embodiment is described in detail in the present embodiment, and includes:

sequentially transmitting the video image data of the n layers to the near-eye display in different channels or in the same channel but at different times by means of wireless or wired communication, wherein the channel(s) are/is physical or logical.

Fifteenth Embodiment

The step S140 of performing reconstruction on and stitching the video image data of the n layers to generate the image which accords with the human gaze effect in the ninth embodiment is described in detail in the present embodiment, and includes:

performing reconstruction on the video image data of the corresponding n layers, such that the resolution and the gray value of the image are restored to a resolution and a gray value which correspond to the near-eye display screen; and reserving an overlap region between adjacent display regions for stitching multi-resolution images, wherein the step of reserving the overlap region includes the processes of judging image data in the overlap region, mutually fusing the images in the overlap region according to different weights and forming a complete picture.

Further, the process of reconstruction and stitching includes image interpolation calculation, image resampling calculation, image enhancement calculation, bilateral filtering calculation and pixel-bit expansion calculation. In particular, nearest neighbor interpolation, bilinear interpolation, bicubic interpolation, spline interpolation, an edge-based image interpolation algorithm and a region-based image interpolation algorithm may be adopted in the image interpolation.

Particularly, in order to reduce a boundary line effect in the process of stitching the texture layers, a middle transition zone is added, a certain overlap region is reserved in the process of stitching the adjacent texture layers, pixels in the overlap region are mutually fused according to different weights to form the image fusion transition zone, which may be specifically described as formula (6):

$$I_F(i,j) = \gamma(i,j) I_A(i,j) + (1-\gamma(i,j)) I_B(i,j) \quad (6)$$

wherein $I_F$ is the pixels in the image fusion transition zone, $I_A$ is the pixels in the current layer, and $I_B$ is the pixels in the next layer; the pixels in different layers may be fused mutually by controlling a value of gamma, and gamma ranges from 0 to 1.

Sixteenth Embodiment

In the present embodiment, a method of obtaining the human gaze point in real time in an eyeball tracking mode is added on the basis of the ninth to thirteenth embodiments. When human eyeballs have changed positions, the near-eye display screen is immediately re-divided into the display subregions according to the new human gaze point, and the central point of the human gaze subregions is obtained again. Recalculation is performed for the displayed image. A time delay for obtaining the displayed image of the near-eye display from the human gaze point is not perceived by a person, thereby avoiding dizziness. In particular, given that the central point of the human gaze subregion has a certain error, an enough margin should be reserved during division of the display subregions and the setting process of the critical spatial frequency, so as to ensure that the error is not perceived by the human eyes.

Further, the eyeball tracking process includes a process of tracking according to the eyeballs and a feature change around the eyeballs, or a process of tracking according to an angle change of an iris, or a process of tracking by actively projecting an infrared beam to the iris and then extracting a feature.

Seventeenth Embodiment

The near-eye display screen has a function of displaying two independent images for the left and right eyes of a person respectively, and the independent image may be divided into a plurality of display subregions including the human gaze subregion. In particular, the two independent images may reflect the human gaze point and the corresponding display subregion tracked by the human eyes respectively.

In another example, the near-eye display screen includes two independent screens for the left and right eyes of the person respectively, and the independent screen may be divided into a plurality of display subregions including the human gaze subregion. In particular, the two independent screens may reflect the human gaze point and the corresponding display subregion tracked by the human eyes respectively.

In the above technical solution of the embodiments of the present disclosure, with the critical frequency of the human eyes, the human gaze region is filtered with the less downsampling coefficient to keep image reality display with higher details and resolution, and the sight edge region is filtered with the greater downsampling coefficient to keep image reality display with lower details and resolution, so as to simulate the human gaze effect, which reduces the data transmission bandwidth while guaranteeing user experiences; the technical solution is suitable for wired and wireless transmission of digital video images.

What is claimed is:

1. A near-eye display apparatus based on human visual characteristics, comprising:
   a near-eye display screen for displaying an image or images;
   a dividing unit for dividing the near-eye display screen into n display subregions according to a human gaze point, wherein the display subregions accord with a human gaze effect and include a human gaze subregion located in a center;
   a calculation unit for calculating critical spatial frequencies corresponding to the n display subregions respectively;
   a creating unit for creating and rendering corresponding video image data of n layers for the n display subregions from an input video image according to the critical spatial frequencies corresponding to the n display subregions respectively;

a transmission unit for transmitting the video image data of the n layers to the near-eye display screen;

a reconstruction unit for performing reconstruction on and stitching the video image data of the n layers to generate an image which accords with the human gaze effect; and a display control unit for displaying the image which accords with the human gaze effect at the near-eye display screen.

2. The near-eye display apparatus according to claim 1, wherein the human gaze effect at least comprises: a display effect with a relatively high amount of image information adopted in the human gaze subregion, a display effect with a relatively low amount of image information adopted in an edge subregion, and a display effect with image information having an amount between a highest amount and a lowest amount adopted in a middle subregion between the human gaze subregion and the edge subregion;

the amount of the image information is described by a spatial resolution and a bit number of a gray value of pixels of the image.

3. The near-eye display apparatus according to claim 1, wherein the dividing unit further has functions of:

quantitatively or continuously dividing the near-eye display screen into n display subregions according to a retinal eccentricity from human eyes to the near-eye display screen;

enabling the n display subregions to include an annular subregion extending from the central human gaze subregion to an edge and/or a corner subregion without display contents; and forming a foveated image with the resolution and a detail according with the human visual characteristics by the n display subregions, and enabling the critical spatial frequency corresponding to each display subregion to decrease with an increase in the retinal eccentricity.

4. The near-eye display apparatus according to claim 1, wherein the calculation unit comprises:

a critical-spatial-frequency calculation subunit for calculating the critical spatial frequency according to an empirical formula or a human-eye model formula, wherein parameters of the empirical formula include the retinal eccentricity, a half-resolution eccentricity constant, a human-eye contrast sensitivity threshold and a spatial-frequency attenuation coefficient, and parameters of the human-eye model formula include the retinal eccentricity, a distance from the pixel to a gaze point and a configurable filter coefficient; and a critical-spatial-frequency setting subunit for setting the critical spatial frequency corresponding to each of the n display subregions as a maximum value of the critical spatial frequency corresponding to positions of all physical pixels in the display subregion or a certain fixed value close to the maximum value.

5. The near-eye display apparatus according to claim 1, wherein the creating unit further comprises:

a data selection subunit for acquiring video image data of corresponding positions of the n display subregions from the input video image according to physical positions of the n display subregions in the near-eye display screen;

a layer generating subunit for performing a downsampling filtering process on the video image data at the respective positions of the n display subregions in different proportions, so as to generate the video image data of the n layers, wherein an image spatial frequency of the video image data of each layer after the downsampling filtering process is equal or close to the critical spatial frequency corresponding to the display subregion; and a pixel smoothing subunit for accumulating low-order data of the pixel in the layer to a surrounding pixel.

6. The near-eye display apparatus according to claim 1, wherein the transmission unit sequentially transmits the video image data of the n layers to the near-eye display in different channels or in the same channel but at different times by means of wireless or wired communication, and the channel(s) are/is physical or logical.

7. The near-eye display apparatus according to claim 1, wherein the reconstruction unit further comprises:

a layer reconstruction subunit for performing reconstruction on the corresponding video image data of the n layers created and rendered by the creating unit respectively, such that the resolution and the gray value of the image are restored to a resolution and a gray value which correspond to the near-eye display screen;

a position analyzing subunit for reserving an overlap region between adjacent display regions and judging image data of the overlap region; and an image stitching subunit for mutually fusing images in the overlap region according to different weights and forming a complete picture.

8. The near-eye display apparatus according to claim 1, wherein the dividing unit, the calculation unit and the creating unit are located at a video-image-source generation end apart from or close to the human eyes, and the reconstruction unit, the display control unit and the near-eye display screen are close to the human eyes.

9. The near-eye display apparatus according to claim 1, wherein the dividing unit, the calculation unit and the creating unit are implemented by software or hardware, the transmission unit, the reconstruction unit and the display control unit are implemented by hardware, the reconstruction unit is located in an independent hardware module or in the same module as the display control unit and the near-eye display screen, and the independent hardware module is connected with the display control unit through a high-speed signal interface.

10. The near-eye display apparatus according to claim 1, wherein an eyeball tracking module is also included for acquiring the monocular or binocular gaze point in real time, transferring information of the gaze point to the dividing unit, the calculation unit, the creating unit, the transmission unit, the reconstruction unit and/or the display control unit in real time, and dividing the screen into the display subregions according to the real-time monocular or binocular gaze point.

11. A near-eye display method based on human visual characteristics, the method comprising:

dividing a near-eye display screen into n display subregions according to a human gaze point by a dividing unit, wherein the display subregions include a human gaze subregion located in a center;

acquiring critical spatial frequencies corresponding to the n display subregions respectively by a calculation unit;

creating and rendering corresponding video image data of n layers for the n display subregions from an input video image according to the critical spatial frequencies corresponding to the n display subregions respectively by a creating unit;

transmitting the video image data of the n layers to the near-eye display by a transmission unit; and performing reconstruction on and stitching the video image data of the n layers to generate an image which accords with the human gaze effect by a reconstruction unit, and displaying the image in the near-eye display screen by a display control unit.

12. The near-eye display method according to claim 11, wherein the human gaze effect at least comprises:
a display effect with a relatively high amount of image information adopted in the human gaze subregion,
a display effect with a relatively low amount of image information adopted in an edge subregion, and
a display effect with image information having an amount between a highest amount and a lowest amount adopted in a middle subregion between the human gaze subregion and the edge subregion;
the amount of the image information is described by a spatial resolution and a bit number of a gray value of pixels of the image.

13. The near-eye display method according to claim 11, wherein the n display subregions are quantitatively or continuously divided according to a retinal eccentricity from human eyes to the near-eye display screen, and include an annular subregion extending from the human gaze subregion to an edge and/or a corner subregion without display contents.

14. The near-eye display method according to claim 11, wherein a foveated image with the resolution and a detail according with the human visual characteristics is formed by the n display subregions, and the critical spatial frequency corresponding to each display subregion decreases with an increase in the retinal eccentricity.

15. The near-eye display method according to claim 11, wherein the critical spatial frequency is obtained according to an empirical formula or a human-eye model formula, parameters of the empirical formula include the retinal eccentricity, a half-resolution eccentricity constant, a human-eye contrast sensitivity threshold and a spatial-frequency attenuation coefficient, and parameters of the human-eye model formula include the retinal eccentricity, a distance from the pixel to a gaze point and a configurable filter coefficient.

16. The near-eye display method according to claim 11, wherein the step of acquiring the critical spatial frequencies corresponding to the n display subregions respectively includes;
setting the critical spatial frequency corresponding to each of the n display subregions as a maximum value of the critical spatial frequency corresponding to positions of all physical pixels in the display subregion or a certain fixed value close to the maximum value.

17. The near-eye display method according to claim 11, wherein the step of creating and rendering the corresponding video image data of the n layers includes:
acquiring video image data of corresponding positions of the n display subregions from the input video image according to physical positions of the n display subregions in the near-eye display screen;
performing a downsampling filtering process on the video image data at the respective positions of the n display subregions in different proportions, so as to generate the video image data of the n layers, wherein an image spatial frequency of the video image data of each layer after the downsampling filtering process is equal or close to the critical spatial frequency corresponding to the display subregion; and
acquiring downsampling coefficients of the video image data of the n layers.

18. The near-eye display method according to claim 11, wherein the step of creating and rendering the corresponding video image data of the n layers includes a step of accumulating low-order data of the pixel to a surrounding pixel, thereby decreasing a number of bits of pixel data.

19. The near-eye display method according to claim 11, wherein the step of performing reconstruction on and stitching the video image data of the n layers includes:
performing reconstruction on the video image data of the corresponding n layers, such that the resolution and the gray value of the image are restored to a resolution and a gray value which correspond to the near-eye display screen; and
reserving an overlap region between adjacent display regions for stitching multi-resolution images, wherein the step of reserving the overlap region includes the steps of judging image data in the overlap region, mutually fusing the images in the overlap region according to different weights and forming a complete picture.

20. The near-eye display method according to claim 11, wherein a central point of the human gaze subregion is obtained in real time in an eyeball tracking mode, and a time delay for obtaining the displayed image of the near-eye display from the central point is not perceived by a person.

* * * * *